(12) United States Patent
Liu et al.

(10) Patent No.: US 12,136,141 B2
(45) Date of Patent: Nov. 5, 2024

(54) GENERATION OF IMAGE CORRESPONDING TO INPUT TEXT USING DYNAMIC VALUE CLIPPING

(71) Applicant: Lemon Inc., Grand Cayman (KY)

(72) Inventors: Bingchen Liu, Los Angeles, CA (US); Yizhe Zhu, Los Angeles, CA (US); Xiao Yang, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 42 days.

(21) Appl. No.: 18/052,866

(22) Filed: Nov. 4, 2022

(65) Prior Publication Data

US 2024/0153152 A1 May 9, 2024

(51) Int. Cl.
*G06T 11/00* (2006.01)
*G06F 40/40* (2020.01)
*G06T 5/70* (2024.01)

(52) U.S. Cl.
CPC .............. *G06T 11/00* (2013.01); *G06F 40/40* (2020.01); *G06T 5/70* (2024.01)

(58) Field of Classification Search
CPC ............ G06T 11/00; G06T 5/70; G06F 40/40
See application file for complete search history.

(56) References Cited

U.S. PATENT DOCUMENTS

| | | |
|---|---|---|
| 11,886,955 B2 | 1/2024 | David |
| 2002/0039199 A1 | 4/2002 | Nose et al. |
| 2012/0044244 A1 | 2/2012 | Huang et al. |
| 2019/0130221 A1 | 5/2019 | Bose et al. |
| 2020/0036861 A1 * | 1/2020 | Gondek ............... H04N 1/4053 |
| 2020/0065342 A1 | 2/2020 | Panuganty |
| 2020/0134089 A1 | 4/2020 | Sankaran et al. |
| 2020/0168252 A1 | 5/2020 | Bhuruth |

(Continued)

FOREIGN PATENT DOCUMENTS

| | | |
|---|---|---|
| EP | 3620935 A1 | 3/2020 |
| WO | 2023239358 A1 | 12/2023 |

OTHER PUBLICATIONS

G. Kim, et al., "DiffusionClip: Text-Guided Diffusion Models for Robust Image Manipulation", Proceedings of the IEEE/CVF Conference on Computer Vision and Pattern Recognition, Jun. 18-24, 2022, pp. 2426-2436 (Year: 2022).*
S. Xu, "CLIP-Diffusion-LM: Apply Diffusion Model on Image Captioning", Oct. 10, 2022, at https://arxiv.org/abs/2210.04559, pp. 1-10 (Year: 2022).*

(Continued)

*Primary Examiner* — Jin Cheng Wang
(74) *Attorney, Agent, or Firm* — Alleman Hall & Tuttle LLP

(57) ABSTRACT

Systems and methods are provided that include a processor executing a program to receive input text from a user. The processor is further configured to, for a predetermined number of iterations, input an initial image into a diffusion process to generate a processed image, back-propagate the processed image through a text-image match gradient calculator to calculate a gradient against the input text, and update the initial image with an image generated by applying the calculated gradient to the processed image. The pixel values of the processed image during a first portion of the predetermined number of iterations are value clamped to a first range, and pixel values of the processed image during a second portion of the predetermined number of iterations are value clamped to a second range that is a subset of the first range.

20 Claims, 13 Drawing Sheets

(56) References Cited

U.S. PATENT DOCUMENTS

| | | |
|---|---|---|
| 2020/0272695 A1 | 8/2020 | Dogan et al. |
| 2020/0342328 A1 | 10/2020 | Revaud et al. |
| 2022/0084204 A1 | 3/2022 | Li et al. |
| 2022/0121702 A1 | 4/2022 | Kale et al. |
| 2022/0277218 A1 | 9/2022 | Fan et al. |
| 2023/0237725 A1 | 7/2023 | Zoss et al. |
| 2023/0267315 A1* | 8/2023 | Kingma ............... G06N 3/047 |
| | | 706/16 |
| 2023/0368337 A1 | 11/2023 | Karras et al. |
| 2023/0377099 A1* | 11/2023 | Kreis ............... G06N 3/0475 |
| 2023/0410270 A1 | 12/2023 | Fujita |
| 2024/0005604 A1 | 1/2024 | Kreis et al. |
| 2024/0037810 A1 | 2/2024 | Gong et al. |
| 2024/0087179 A1 | 3/2024 | Min et al. |
| 2024/0111894 A1 | 4/2024 | Kreis et al. |
| 2024/0112088 A1 | 4/2024 | Yu et al. |
| 2024/0115954 A1 | 4/2024 | Olson et al. |
| 2024/0153093 A1* | 5/2024 | Xu ............... G06V 10/40 |

OTHER PUBLICATIONS

Zbinden, R., "Implementing and Experimenting with Diffusion Models for Text-to-Image Generation," Master Thesis, École Polytechnique Fédérale de Lausanne, Machine Learning and Optimization Lab (MLO), Sep. 23, 2022, 63 pages.

Xu, S., "LIP-Diffusion-LM: Apply Diffusion Model on Image Captioning," arXiv Computer Vision and Pattern Recognition (cs.CV), Oct. 10, 2022, 10 pages.

Nichol, A. et al., "Glide: Towards Photorealistic Image Generation and Editing with Text-Guided Diffusion Models," Proceedings of the 39th International Conference on Machine Learning (ICML 2022), Jul. 17, 2022, Baltimore, Maryland, 20 pages.

Ramesh, A. et al., "Hierarchical Text-Conditional Image Generation with CLIP Latents," arXiv Computer Vision and Pattern Recognition (cs.CV), Apr. 13, 2022, 27 pages.

United States Patent and Trademark Office, Office Action Issued in U.S. Appl. No. 18/052,865, Aug. 22, 2024, 19 pages.

United States Patent and Trademark Office, Office Action Issued in U.S. Appl. No. 18/067,642, Sep. 16, 2024, 26 pages.

* cited by examiner

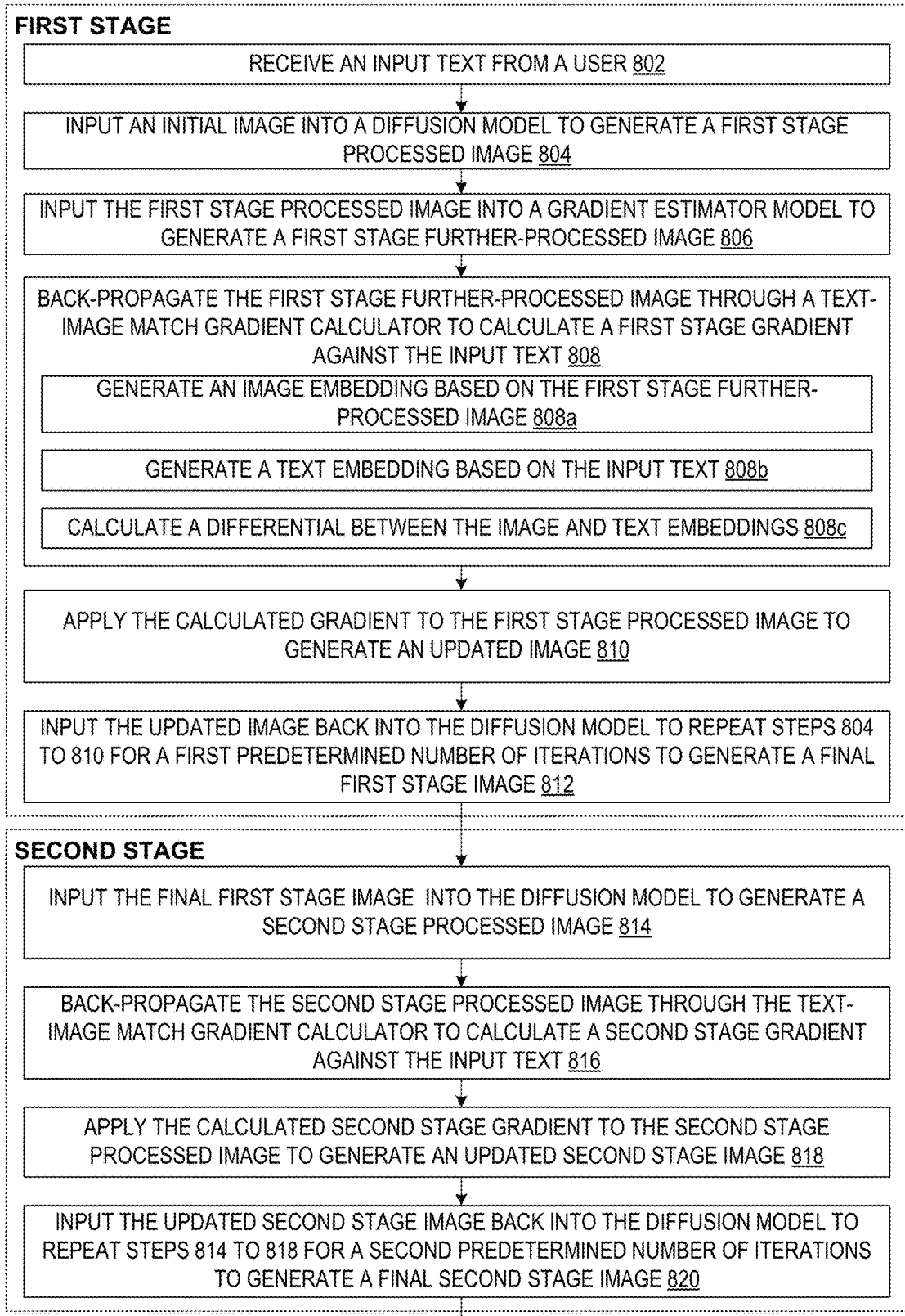
FIG. 8A  CONTINUED AT FIG. 8B

GENERATION OF IMAGE CORRESPONDING TO INPUT TEXT USING DYNAMIC VALUE CLIPPING

BACKGROUND

Diffusion models are a class of probabilistic generative models that typically involve two stages, a forward diffusion stage and a reverse denoising stage. In the forward diffusion process, input data is gradually altered and degraded over multiple iterations by adding noise at different scales. In the reverse denoising process, the model learns to reverse the diffusion noising process, iteratively refining an initial image, typically made of random noise, into a fine-grained colorful image.

Contrastive language-image pretraining (CLIP) models are language-text matching models that includes an image encoder and a text encoder. The image and text encoders project images and sentences, respectively, into vectors in a same learned latent space. In such a CLIP-learned latent space, image vectors and text vectors are positioned closer when the corresponding image and text have similar semantic meaning.

SUMMARY

In view of the above, a computer system for generating an output image corresponding to an input text is provided. The computing system includes a processor and memory of a computing device, the processor being configured to execute a program using portions of the memory to receive the input text from a user. The processor is further configured to, for a predetermined number of iterations, input an initial image into a diffusion process to generate a processed image, back-propagate the processed image through a text-image match gradient calculator to calculate a gradient against the input text, and update the initial image with an image generated by applying the calculated gradient to the processed image. The pixel values of the processed image during a first portion of the predetermined number of iterations are value clamped to a first range, and pixel values of the processed image during a second portion of the predetermined number of iterations are value clamped to a second range that is a subset of the first range.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 8A and 8B are a flowchart of a method for generating an output image corresponding to an input text using a multi-algorithm diffusion sampling process according to an example embodiment of the present disclosure.

DETAILED DESCRIPTION

Diffusion models can be combined with CLIP models trained on image-text pairs to implement a denoising-based image generation process for a given text input. The CLIP-guided diffusion process aims to generate an image with content corresponding to the given text input by iteratively refining an initial noisy image. The iterative process outputs an image at each iteration, and the CLIP model computes the similarity between the generated image and the given text description. Based on the similarity score, a gradient is provided to revise the generated image for the next iteration. The process iteratively continues until a final output image is produced based on predetermined criteria. For example, the process can continue until a predetermined number of iterations has been performed.

Current CLIP-guided diffusion models have drawbacks that prevent them from being implemented in certain applications. For example, many current models may take over 500 iterations to generate a desired image. Such speeds are non-ideal for implementation in real-time applications. Other disadvantages include low content safety, low image quality, and unpredictable text-to-image matching and object location. In view of these observations, the present disclosure describes various methods and systems for CLIP-guided diffusion models capable of addressing the aforementioned issues. Such methods and systems are described below in further detail.

Figure 1:
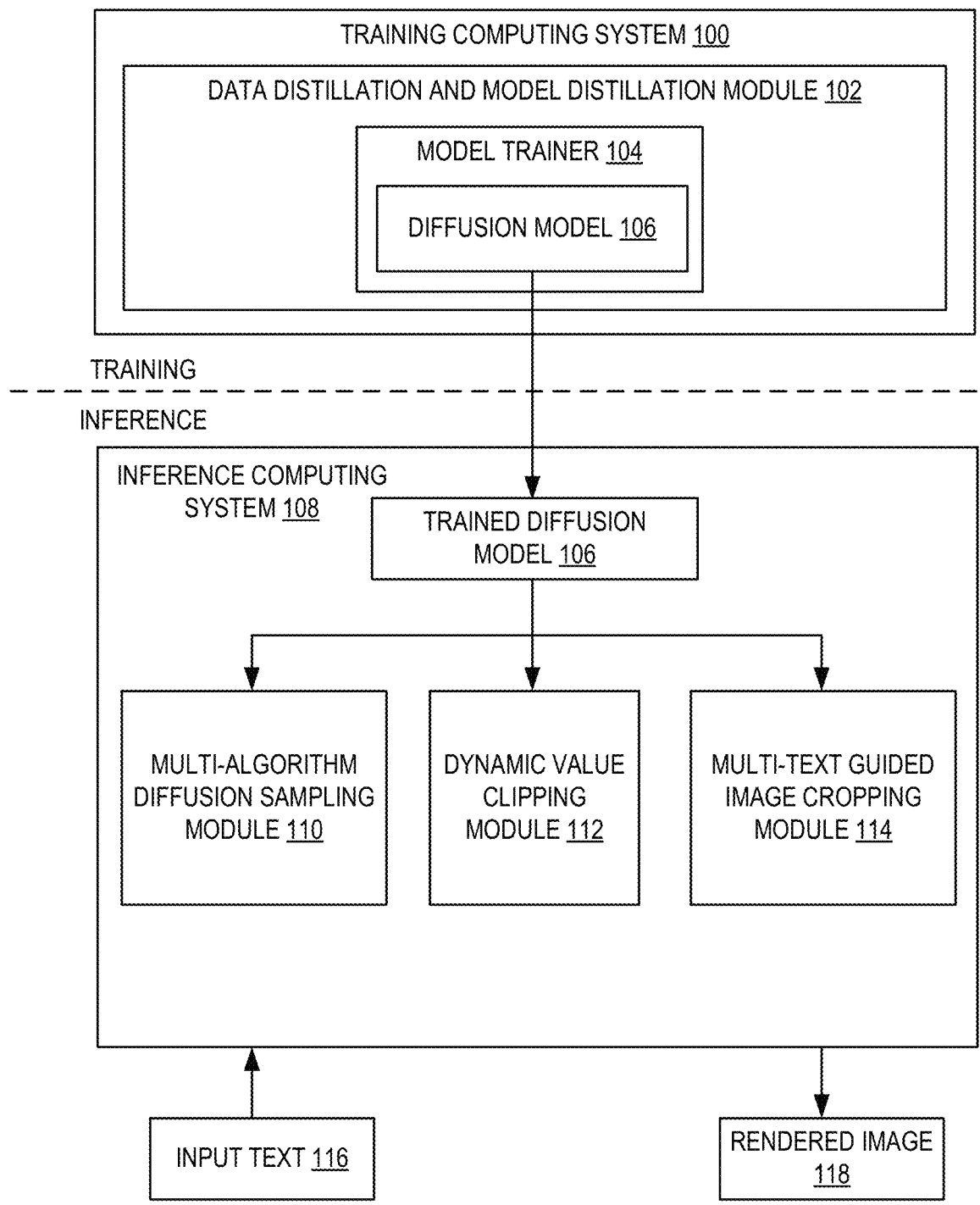
FIG. 1 illustrates a schematic view of a training computing system and an inference computing system according to an example of the present disclosure.

Referring to FIG. 1, a process of generating a rendered image using a CLIP-guided diffusion process is schematically depicted from the training steps to the inference steps. Initially, a training computing system 100 executes a data distillation and model distillation module 102, which includes a model trainer 104 configured to train a diffusion model 106 using training data. The diffusion model 106 trained by the model trainer 104 is then installed on an inference computing system 108 and used by a multi-algorithm diffusion sampling module 110, a dynamic value clipping module 112, and/or a multi-text guided image cropping module 114 to receive and process an input text 116 to generate a rendered image 118 with content corresponding to the input text 116, as explained in further detail below.

Figure 2:
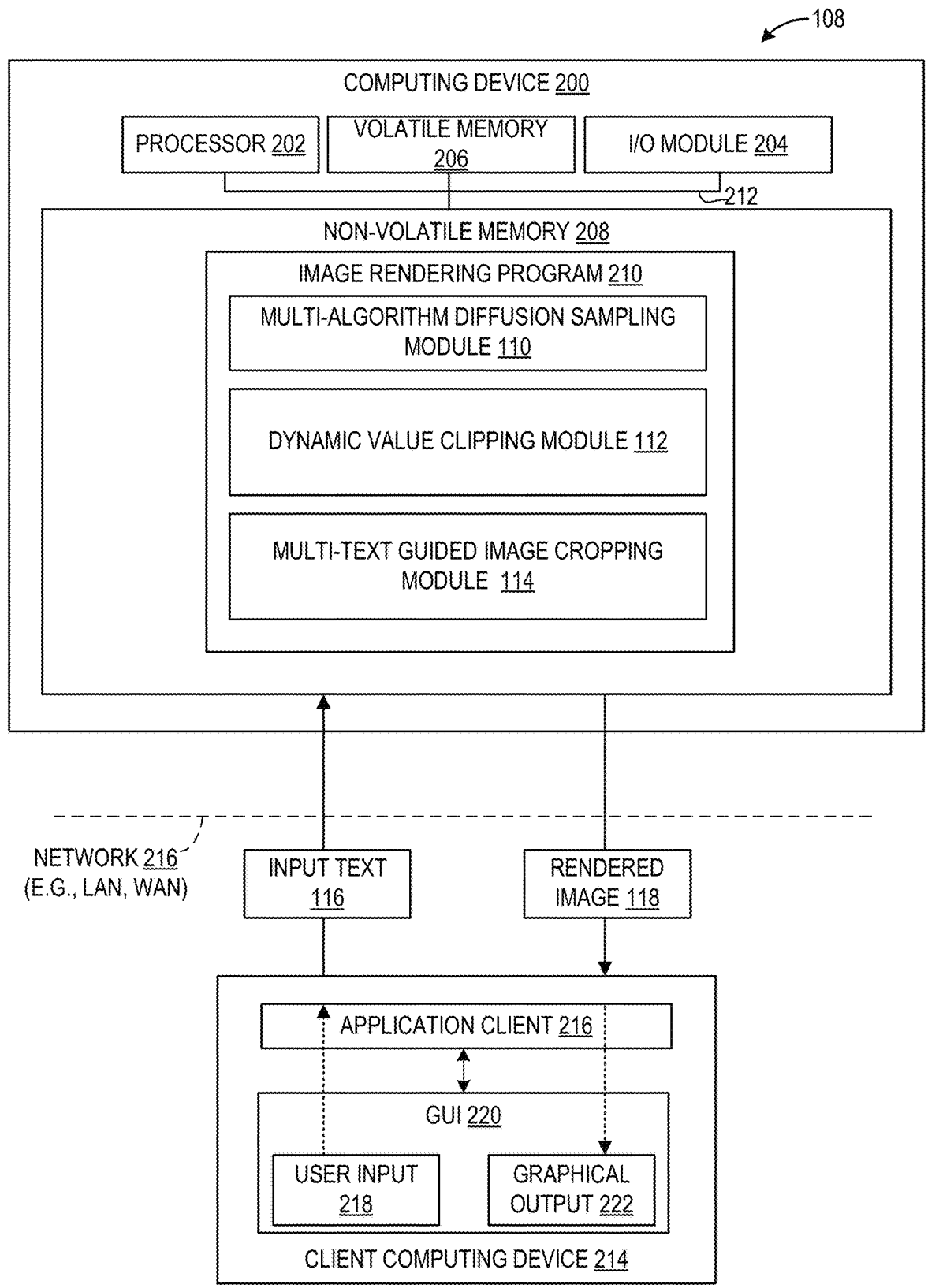
FIG. 2 illustrates a detailed schematic view of the inference computing system of FIG. 1.

Referring to FIG. 2, an inference computing system 108 for generating a rendered image using a CLIP-guided diffusion process is provided. The inference computing system 108 comprises a computing device 200 including a processor 202, an input/output module 204, volatile memory 206, and non-volatile memory 208 storing an image rendering program 210 comprising a multi-algorithm diffusion sampling module 110, a dynamic value clipping module 112, and a multi-text guided image cropping module 114. A bus 212 may operatively couple the processor 202, the input/output module 206, and the volatile memory 204 to the non-volatile memory 208. The inference computing system 108 is operatively coupled to a client computing system 214 via a network 216. In some examples, the network 216 may take the form of a local area network (LAN), wide area network (WAN), wired network, wireless network, personal area network, or a combination thereof, and can include the Internet. Although the image rendering program 210 is depicted as hosted at one computing device 200, it will be appreciated that the image rendering program 210 may alternatively be hosted across a plurality of computing devices to which the computing device 200 may be communicatively coupled via a network, including network 216.

The processor 202 is configured to store the image rendering program 210 in non-volatile memory 208 that retains instructions stored data even in the absence of externally applied power, such as FLASH memory, a hard disk, read only memory (ROM), electrically erasable programmable memory (EEPROM), etc. The instructions include one or more programs, including the image rendering program 210, and data used by such programs sufficient to perform the operations described herein. In response to execution by the processor 202, the instructions cause the processor 202 to execute the image rendering program 210, which includes the multi-algorithm diffusion sampling module 110, the dynamic value clipping module 112, and the multi-text guided image cropping module 114.

The processor 202 is a microprocessor that includes one or more of a central processing unit (CPU), a graphical processing unit (GPU), an application specific integrated circuit (ASIC), a system on chip (SOC), a field-programmable gate array (FPGA), a logic circuit, or other suitable type of microprocessor configured to perform the functions recited herein. Volatile memory 206 can include physical devices such as random access memory (RAM), static random access memory (SRAM), dynamic random access memory (DRAM), etc., which temporarily stores data only for so long as power is applied during execution of programs. Non-volatile memory 208 can include physical devices that are removable and/or built in, such as optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology.

In one example, a user operating the client computing device 214 may send an input text 116 to the computing device 200. The processor 202 of the computing device 200 is configured to receive the input text 116 from the user and execute the image rendering program 210 to generate a rendered image 118 with content that corresponds to the input text 116. The processor 202 then returns the rendered image 118 to the client computing device 214.

The client computing device 214 may execute an application client 216 to send the input text 116 to the computing device 200 upon detecting a user input 218 and subsequently receive the rendered image 118 from the computing device 200. The application client 216 may be coupled to a graphical user interface 220 of the client computing device 214 to display a graphical output 222 of the rendered image 118.

Although not depicted here, it will be appreciated that the training computing system 100 that executes the data distillation and model distillation module 102 of FIG. 1 can be configured similarly to computing device 200.

Figure 3:
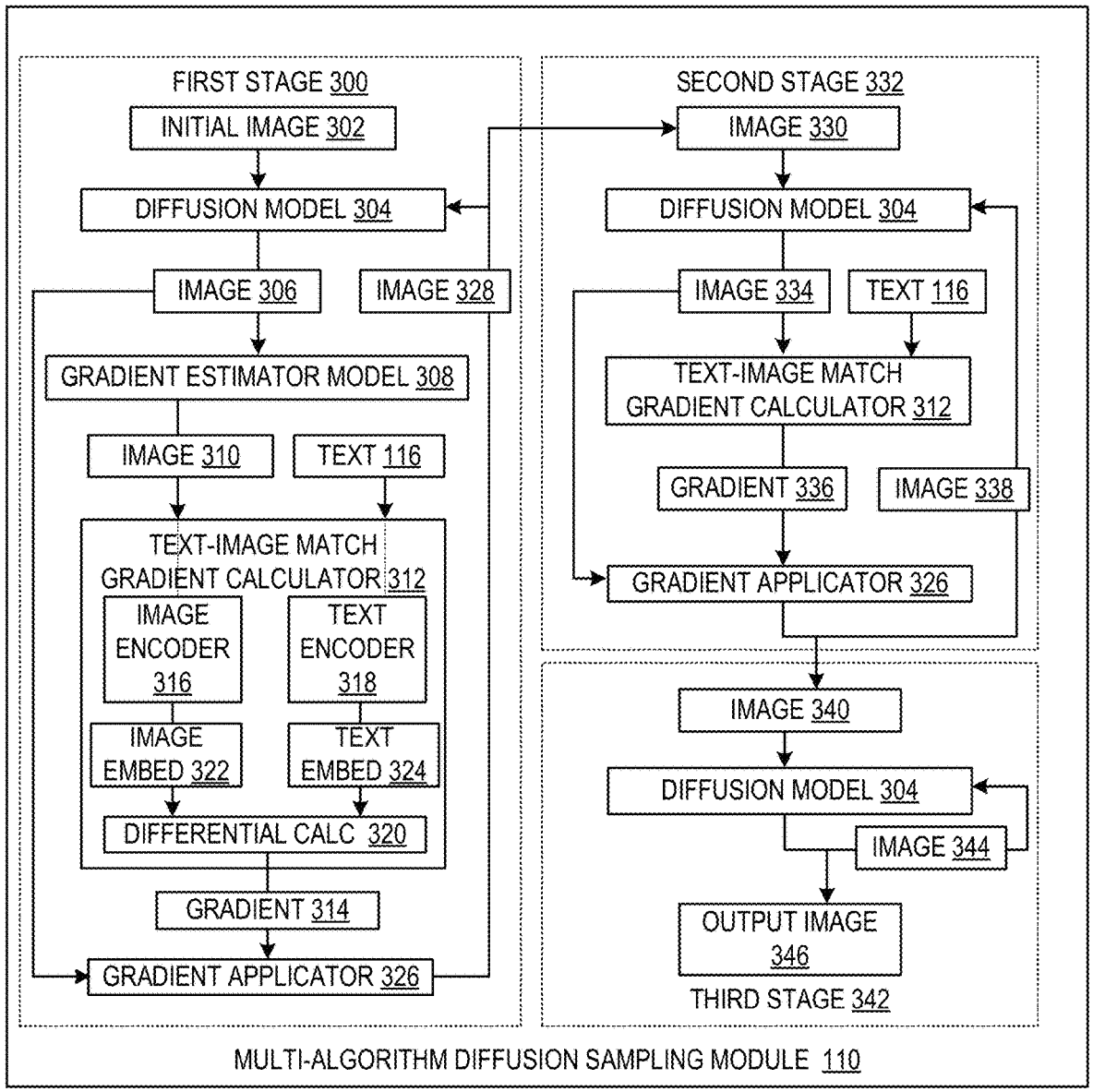
FIG. 3 illustrates a detailed schematic view of the multi-algorithm diffusion sampling module of the inference computing system of FIG. 1.

Referring to FIG. 3, operations of the multi-algorithm diffusion sampling module 110 of FIGS. 1 and 2 are described in detail. An input text 116 is received from a user. At a first stage 300, an initial image 302, which may include an image of random noise, is inputted into a diffusion model 304 that processes the initial image 302 to generate a first stage processed image 306. The images 302, 306 may be of various sizes and formats. For example, one or more of the images 302, 306 may have a size of 512*512*3 pixel values. The first stage processed image 306 generated by the diffusion model 304 is inputted into a gradient estimator model 308.

In many implementations, the gradient estimator model 308 is also a diffusion model that is smaller than the diffusion model 304 used to process the initial image 302. Size differences between the diffusion model 304 and the gradient estimator model 308 may vary. In some implementations, the gradient estimator model 308 may be at least 10 times smaller than the diffusion model 304. The diffusion model 304 may have 500 MB of parameters, while the gradient estimator model 308 may have 50 MB of parameters, for example.

The gradient estimator model 308 processes the first stage processed image 306 to generate a first stage further-processed image 310. Then, a text-image match gradient calculator 312 receives the input text 116 from the user and the first stage further-processed image 310. The first stage further-processed image 310 is then back-propagated through the text-image match gradient calculator 312 to calculate a first stage gradient 314 against the input text 116.

The text-image match gradient calculator 312 includes an image encoder 316, a text encoder 318, and a differential calculator 320. The image encoder 316 receives the first stage further-processed image 310 as input to generate an image embedding 322 based on the first stage further-processed image 310. The text encoder 318 receives the input text 116 to generate a text embedding 324 based on the input text 116. The differential calculator 320 calculates a differential between the image embedding 322 and the text embedding 324, and outputs the first stage gradient 314 as the calculated differential.

A gradient applicator 326 then applies the calculated first stage gradient 314 to the first stage processed image 306, which was generated by the diffusion model 304, to generate an updated initial image 328. As described above, the first stage gradient 314 is calculated using the first stage further-processed image 310, which was generated by the gradient estimator model 308. Since the gradient estimator model 308 is smaller than the diffusion model 304, calculating the first stage gradient 314 using the first stage further-processed image 310 would include an "estimated" back-propagation process that is faster than if the first stage processed image 306 were used to instead calculate the first stage gradient. As such, the gradient estimator model 308 acts as a proxy for the diffusion model 304, allowing for a much faster image generation process while maintaining acceptable image quality.

The updated initial image 328 generated by the gradient applicator 326 is inputted back into the diffusion model 304, and the process continues for a first predetermined number of iterations. The number of iterations can vary. In some embodiments, the first predetermined number of iterations is between 50 to 70 iterations. In further embodiments, the first predetermined number of iterations is 60 iterations. After the first predetermined number of iterations is performed at the first stage 300, a final first stage image 330 is generated by the gradient applicator 326 and is inputted into the diffusion model 304 at a second stage 332.

At the second stage 332, the final first stage image 330 is inputted into the diffusion model 304, which processes the final first stage image 330 to generate a second stage processed image 334. The second stage processed image 334 outputted by the diffusion model 304 is back-propagated through the text-image match gradient calculator 312 to calculate a second stage gradient 336 against the input text 116. The gradient applicator 326 then applies the second stage gradient 336 to the second stage processed image 334 to generate an updated second stage image 338. The updated second stage image 338 generated by the gradient applicator 326 is inputted back into the diffusion model 304, and the process continues for a second predetermined number of iterations. The number of iterations can vary. In some embodiments, the second predetermined number of iterations may be between 5 to 15 iterations. In further embodiments, the second predetermined number of iterations is 10 iterations. After the second predetermined number of iterations is performed at the second stage 332, a final second stage image 340 generated by the gradient applicator 326 is inputted into the diffusion model 304 at a third stage 342. It will be appreciated that, unlike the first stage 300, the second stage 332 does not include a step for processing an image using the gradient estimator model 308. By neither back-propagating through the diffusion model 304 nor the gradient estimator model 308, the image generation process will be much faster than conventional methods. From the iterations performed during the first stage, the current second stage processed image 334 is at an acceptable level of quality such that the second stage gradient 336 output from the text-image match gradient calculator 312 is adequate to revise the second stage processed image 334 directly.

At the third stage 342, the final second stage image 340 is inputted into the diffusion model 304, which processes the final second stage image 340 to generate an updated third stage image 344. The updated third stage image 344 is inputted back into the first diffusion model 304 for a third predetermined number of iterations. The number of iterations can vary. In some embodiments, the third number of predetermined iterations may be between 15 to 25 iterations, and preferably 20 iterations. In further embodiments, the third predetermined number of iterations is 20 iterations. After the third number of iterations is performed at the third stage 342, a final third stage image 346 is outputted as the output image. The output image 346 may be displayed on the client computing device 214 as the graphical output 222, or further processed into the rendered image 118. It will be appreciated that, unlike the first stage 300 or the second stage 332, the third stage 342 does not include a step for calculating a gradient of an image against the input text 116. Such implementations allow for faster image generation while maintaining an acceptable level of quality. In alternative embodiments, the third stage 342 may be omitted and the final second stage image 340 is outputted as the output image.

It will be appreciated that the three instances of diffusion model 304 depicted in FIG. 3 may represent one diffusion model, the two instances of text-image match gradient calculator 312 may represent one text-image match gradient calculator, and the two instances of gradient applicator 326 may represent one gradient applicator in the multi-algorithm diffusion sampling module 110.

The diffusion model 304 is a generative model that iteratively refines the initial image, which may include an image of random noise, into an output image 346. Compared to conventional diffusion models, which may require hundreds of iterations to generate a desired image from random noise, the multi-algorithm diffusion sampling module 110 of the present invention may generate the desired image from random noise in fewer iterations. In some embodiments, the desired image is generated in less than one hundred total iterations, including the combined iterations performed in the first stage 300, the second stage 332, and the third stage 342.

The diffusion model 304 and the gradient estimator model 308 may be configured as diffusion probabilistic models, which are a type of latent variable models that includes a forward diffusion process and a reverse diffusion process. The diffusion probabilistic model may be a denoising diffusion implicit model (DDIM), for example.

Figure 4:
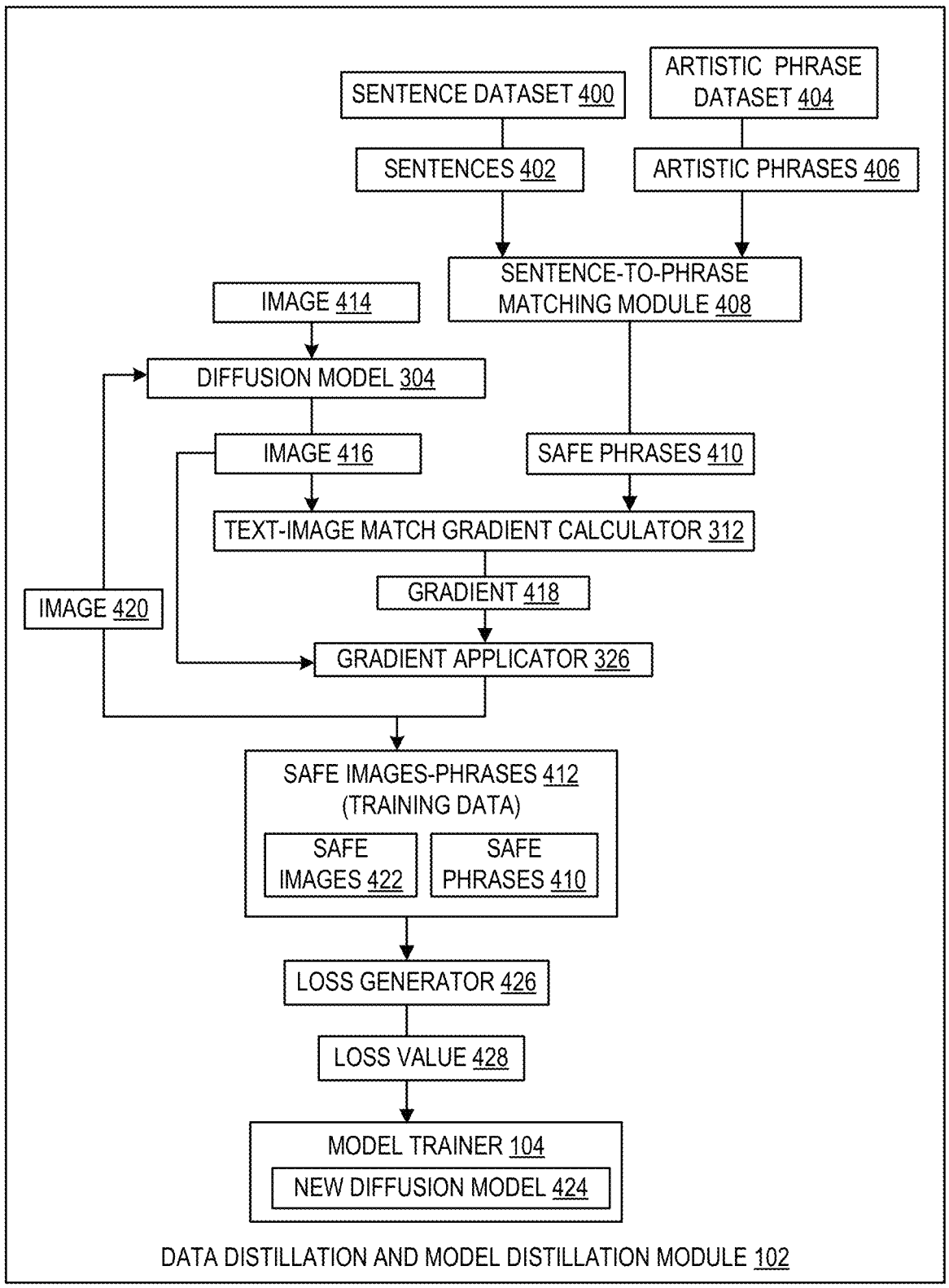
FIG. 4 illustrates a detailed schematic view of the data distillation and model distillation module of the training computing system of FIG. 1.

Referring to FIG. 4, operations of the data distillation and model distillation module 102 of FIGS. 1 and 2 are described in detail. A sentence dataset 400 is provided. The sentence dataset 400 includes sentences 402, which may include partial sentences, that describe objects, scenes, and/or scenarios. Example sentences 402 include "a cute cat," "a table full of breakfast," and "a man sitting in a cool car with sunglasses." The sentence dataset 400 may be curated to exclude any undesired or inappropriate content type.

In some embodiments, the sentence dataset 400 is curated to include a first content type while excluding a second content type according to a predetermined set of content policy guidelines. For example, the second content type can include content that is deemed unsafe in accordance with a set of predetermined content policy guidelines. During curation, human curators or a curation program labels sentences 402 meeting the set of predetermined content policy guidelines with the appropriate content label. For example, the set of predetermined content policy guidelines include determining whether the sentences 402 contain personal names, names of groups of individuals, violent objects and scenes, biased terms, and/or other unsafe content. Unsafe content can include content that incites hatred, content that promotes discrimination, content that threatens or advocates for physical or mental harm on oneself or others, exploitative content that extorts or blackmails others, and/or content depicting sexual acts or themes. During curation, sentences 402 satisfying these criteria can be labeled by human curators or a curation program with a second content type label. In such cases, sentences 402 having the second content type labels can be removed from the sentence dataset 400. On the other hand, sentences 402 not satisfying the predetermined content policy guidelines described above can be labeled with a first content type label and deemed safe content. In such cases, the sentences 402 with the first content type labels can remain in the sentence dataset 400.

An artistic phrase dataset 404 is also provided, which includes artistic phrases 406 that are configured to be attached to the sentences 402 in the sentence dataset 400.

For example, the artistic phrases 406 may be attached as prefixes and/or postfixes to the sentences 402. The artistic phrases 404 may indicate an artistic style in which an image is to be rendered. For example, artistic phrases 404 may include "a beautiful painting of," "in Romanticism style," and "cartoon style." Similar to the sentence dataset 400, the artistic phrase dataset 404 may be curated to exclude certain artistic styles. For example, the artistic phrase dataset 404 may be curated to exclude photorealistic styles.

A sentence-to-phrase matching module 408 receives input of sentences 402 from the sentence dataset 400 and artistic phrases 406 from the artistic phrase dataset 404. The sentence-to-phrase matching module 408 matches the sentences 402 from the sentence dataset 400 with artistic phrases 406 from the artistic phrase dataset 404 to generate and output a plurality of phrases 410. As the sentences 402 are curated to not include any unsafe content, the plurality of phrases 410 can be considered safe phrases. The sentences 402 and the artistic phrases 406 can be matched randomly or systematically. Example matchings include matching the sentence 402 "a cute cat" with an artistic phrase 406 "a beautiful painting of" to output a safe phrase 410, "a beautiful painting of a cute cat."

The text-image match gradient calculator 312 receives input of the safe phrases 410 to generate safe phrase-image pairs 412 using images generated by a diffusion model 304, which can be implemented similar to the diffusion models described in the sections above. As described earlier with reference to FIG. 3, an initial image 414, which may include an image of random noise, is inputted into the diffusion model 304, which processes the initial image 414 to generate a processed image 416. The processed image 416 is inputted into the text-image match gradient calculator 312. Then, the processed image 416 is back-propagated through the text-image match gradient calculator 312 to calculate a gradient 418 against a safe phrase from the plurality of safe phrases 410.

A gradient applicator 326 then applies the gradient 418 to the processed image 416 to generate an updated image 420, which is inputted back into the diffusion model 304. The process repeats for a predetermined number of iterations for each of the safe phrases 410. In one embodiment, the predetermined number of iterations may be 15 to 25 iterations, and preferably 20 iterations. After the predetermined number of iterations are performed, the gradient applicator 326 outputs a safe image 422, which is the product of processing the updated images 420 through the diffusion model 304, the text-image match gradient calculator 312, and the gradient applicator 326 for the predetermined number of iterations. Using the example described above, safe images 422 are a first type of image that has been generated based on models trained only on the second type of content and not on the first type of content. Unsafe images are images that are trained at least partially on the first type of content.

For each safe phrase 410, a corresponding safe image 422 is generated and paired with to form a safe phrase-image pair 412. These pairs of safe phrases and safe images 412 can be used as training data to train a new diffusion model 424. The safe image-phrase pairs 412 can be inputted into a loss generator 426, which generates and outputs at least a loss value 428. The loss value 428 may include an identity loss and/or a directional loss. The generated loss value 428 is used by a model trainer 104 to train a new diffusion model 424.

The diffusion models 304, 424 may be configured to convert input images to latent noises through a forward diffusion score function. The model trainer 104 may fine-tune the score function in the reverse diffusion process using a loss value 428 that controls the attributes of the generated image based on the input text 116.

As the new diffusion model 424 is trained using the safe image-phrase pairs 412 as training data, the model 424 will be much less likely to output images with unsafe information, such as personal names, violent objects and scenes, biased terms, and/or other unsafe content. Further, since the diffusion model 424 is pretrained using artistic phrases describing different artistic styles in which an image is to be rendered, the diffusion model 424 may be configured to generate images of desired artistic styles. Likewise, the diffusion model 424 may also be configured to not generate images of specific styles. For example, the diffusion model 424 may be configured to not generate photo-realistic images. In such cases, the artistic phrases 406 can be curated to not contain any keywords associated with photo-realism. Further, the new diffusion model 424 may be configured to be smaller than the original diffusion model 304, thereby reducing computational requirements and increasing image rendering speeds. In some implementations, the new diffusion model 424 is five times smaller than the first diffusion model 304.

Figure 5:
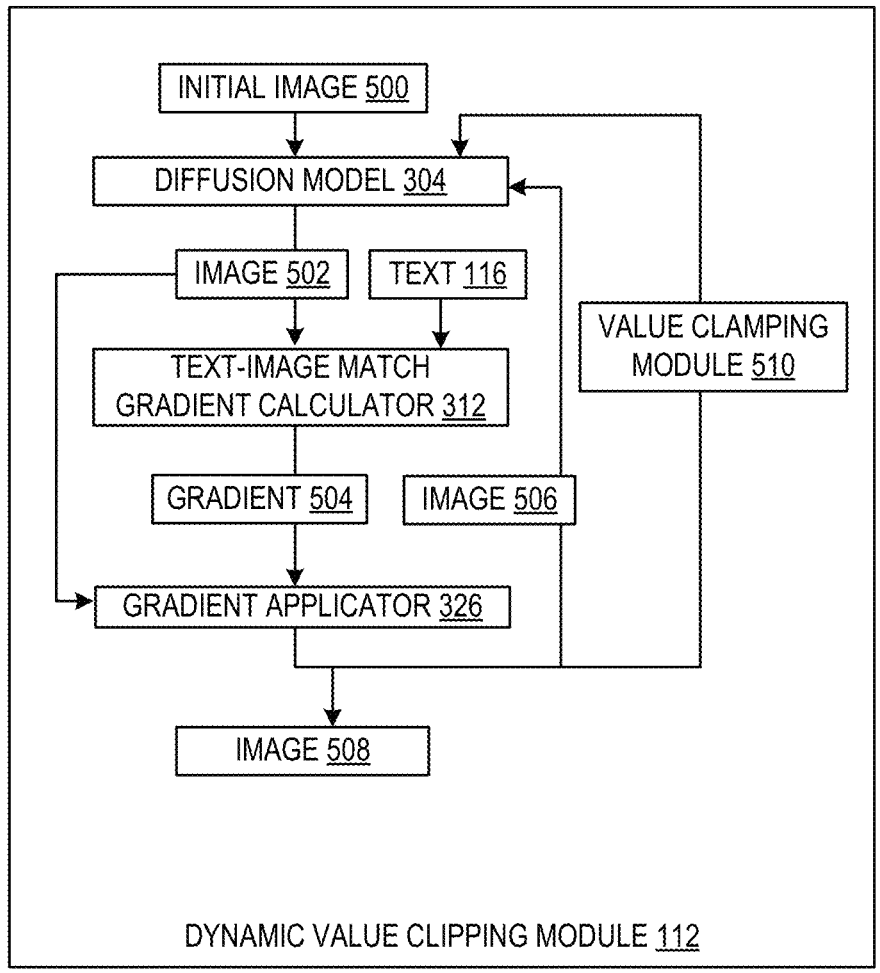
FIG. 5 illustrates a detailed schematic view of the dynamic value clipping module of the inference computing system of FIG. 1.

Referring to FIG. 5, operations of the dynamic value clipping module 112 of FIGS. 1 and 2 are described in detail. An input text 116 is received from a user. An initial image 500, which may include an image of random noise, is inputted into a diffusion model 304 that processes the initial image 500 to generate a processed image 502. Processing of the initial image 500 can include transformation of the image through a denoising process that adjusts the pixel values of the image based on a probabilistic distribution. In many implementations, the process uses Gaussian noise distribution. For example, the initial image 500 can be a random noise image with pixel values sampled from a Gaussian unit, with a mean of 0 and a standard deviation of 1, where the units are normalized by dividing the pixel value with the maximum range of the final image pixel value (e.g., 255). Other types of noise distribution can also be implemented.

A text-image match gradient calculator 312 receives the input text 116 and the processed image 502. The processed image 502 is then back-propagated through the text-image match gradient calculator 312 to calculate a gradient 504 against the input text 116. A gradient applicator 326 then applies the calculated gradient 504 to the processed image 502 to generate an updated initial image 506. The updated initial image 506 is inputted back into the diffusion model 304, and the process continues for a predetermined number of iterations to generate a final output image 508.

At each iteration, a value clamping module 510 determines the maximum pixel value range ("clamping") for the processed image 502 during the denoising process of the diffusion model 304. The scale and timing at which to clamp the processed image 502 can determine certain tendencies of the final output image 508. Specifically, color saturation is particularly high if the values are scaled up at early iterations. Conversely, the final output image 508 will tend to have muted and dull colors if the values are scaled down at early iterations. Ranges in the pixel values can also affect the content of the generated image. For example, larger value ranges in the early iterations can lead to more diverse content in the final output image 508 while smaller value ranges can result in smoother but less diverse content. In view of these observations, the value clamping module 510 is implemented to apply a dynamic value clamping to the diffusion process to produce more stable, color-vibrant, and content-rich results.

The value clamping module 510 can be configured to perform clamping at different value ranges for different iterations of the diffusion process for the diffusion model 304. In some implementations, the value clamping module 510 clamps the pixel value at a first value range for a first portion of the predetermined number of iterations and at a second value range narrower than the first value range for a second portion of the predetermined number of iterations. For example, during the first portion of the predetermined number of iterations, pixel values of the processed image that are higher than the maximum value of the first range are reduced to the maximum value of the first range, and pixel values of the processed image that are lower than the minimum value of the first range are increased to the minimum value of the first range. Additional clamping steps can be implemented, and the predetermined number of iterations can be divided into any number of portions with different clamping ranges. For example, the value clamping module 510 can be configured to clamp the pixel value at a third value range narrower than the second value range for a third portion of the predetermined number of iterations.

Different value ranges and portion ratios of iterations can be implemented for the different clamping steps. In some implementations, the first portion is at least the first half of the predetermined number of iterations. In further implementations, the first portion is at least the first 70% of the predetermined number of iterations. The second portion can also vary. For example, the second portion can be approximately twenty percent of the predetermined number of iterations and is successive to the first portion. In some implementations, the second portion is the remaining number of iterations after the first portion. In other implementations, a third portion is implemented to be the remaining number of iterations after the first and second portions.

The value ranges become narrower for successive clamping steps. For example, the second value range is a subset of the first value range, and the third value range, if applicable, is a subset of the second value range. In some implementations, the first value range is approximately [−3,3]. In further implementations, the second value range is approximately [−1.4,1.4]. The values are normalized to the maximum value for a given pixel of the final output image. As such, the last clamping step can be limited to a value range of [−1,1].

Figure 6:
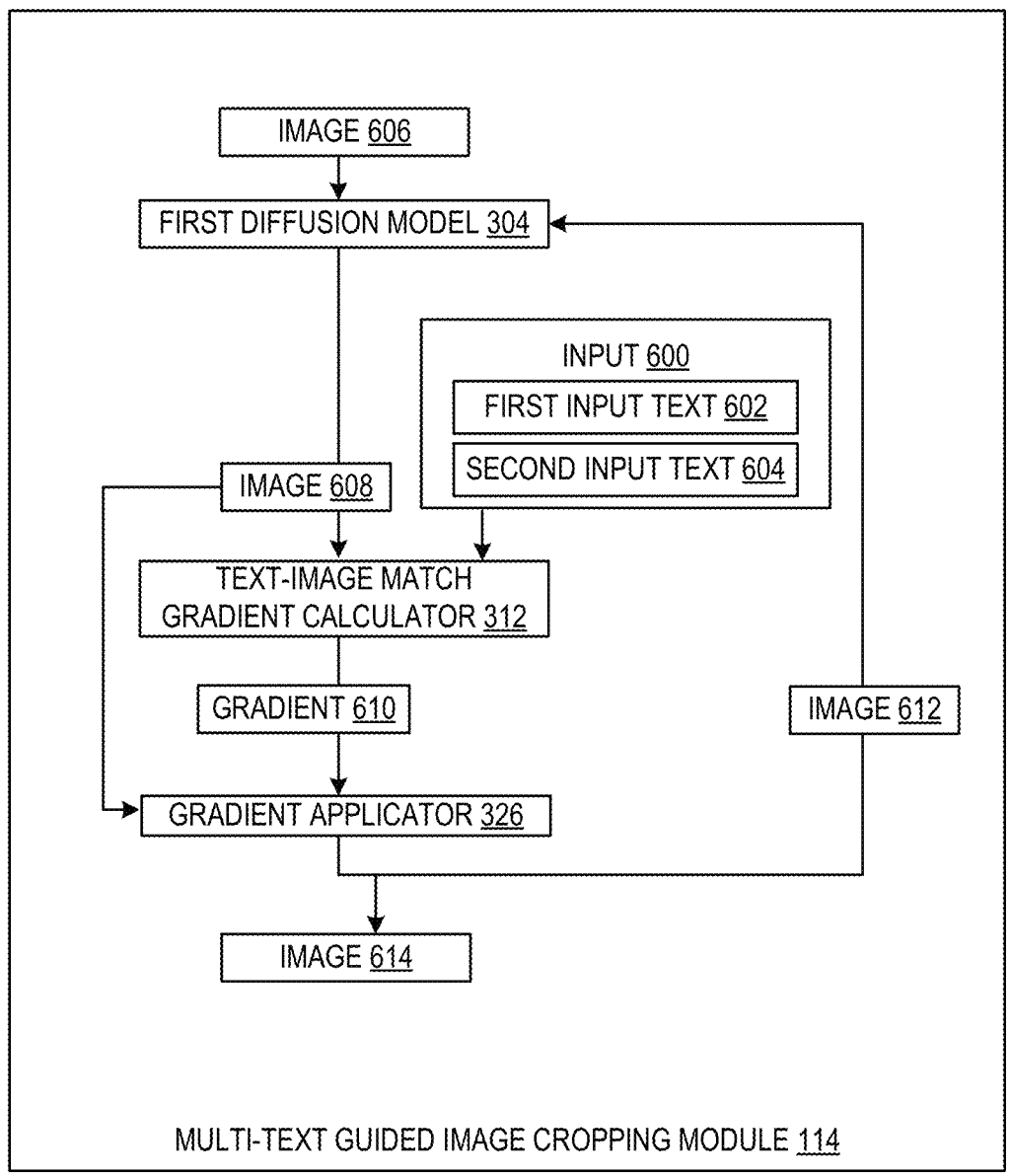
FIG. 6 illustrates a detailed schematic view of the multi-text guided image cropping module of the inference computing system of FIG. 1.

Referring to FIG. 6, operations of the multi-text guided image cropping module 114 of FIGS. 1 and 2 are described in detail. In traditional CLIP-guided diffusion methods, the input is limited to a single sentence to guide the generation of the entire image. However, such methodology can lead to the generation of objects at undesired locations, such as illogical placements. For example, a single guided text "house" can cause the diffusion model to generate a house in locations that can appear odd or illogical. As such, the multi-text guided image cropping module 114 can be implemented to receive different text inputs for different regions of the image to be generated.

As shown in the multi-text guided image cropping module 114 of FIG. 6, an input 600 is received from a user. The input includes a first input text 602 and a second input text 604. An initial image 606, which may include an image of random noise, is inputted into a diffusion model 304 that processes the initial image 606 to generate a processed image 608. The first input text 602 can be associated with a first region of the image, and the second input text 604 can be associated with a second region of the image. The regions can be determined in many different ways. In some implementations, the regions are determined based on information in the input 600 received from the user. For example, the input 600 could specify a region of the image where the content of the input text is to be generated. In some implementations, the regions are determined using natural language processing techniques on the input text 602, 604.

A text-image match gradient calculator 312 receives the input 600 and the processed image 608. The processed image 608 is then back-propagated through the text-image match gradient calculator 312 to calculate a gradient 610 against the input 600. To get feedback from the CLIP model for text-and-image consistency, a plurality of patches of the original generated image are randomly determined and fed into the CLIP model. For each of the plurality of patches, an image embedding is generated based on the processed image 608, and a text embedding is generated based on the region and the input text that are associated with the patch. The gradient 610 is calculated based on a differential between the image embedding and the text embedding.

Patches can be associated with a region, and consequently the input text, based on a number of different methods. The generalization from a single text input to multiple text inputs in diffusion models is straightforward except for patches in the areas around the boundary of the regions associated with the different text inputs 602, 604. For example, if a patch intersects multiple regions, computing the text embedding may be more complicated. One method for dealing with such cases includes the use of a weighted average method. The text embedding for a given patch is the weighted average of the text embeddings from the intersected regions, where the weights are proportional to the intersected area. Another method includes the maximum intersection region dominating method where the text embedding for a given patch is the text embedding from the region with the largest area intersecting the given patch.

A gradient applicator 326 then applies the calculated gradient 610 to the processed image 608 to generate an updated initial image 612. The updated initial image 506 is inputted back into the diffusion model 304, and the process continues for a predetermined number of iterations to generate a final output image 614.

Although FIGS. 1-3 and 5-6 depict the multi-algorithm diffusion sampling module 110, the dynamic value clipping module 112, and the multi-text guided image cropping module 114 as separate image generation modules, different combinations of these modules can be implemented within a single image generation process.

Figure 7:
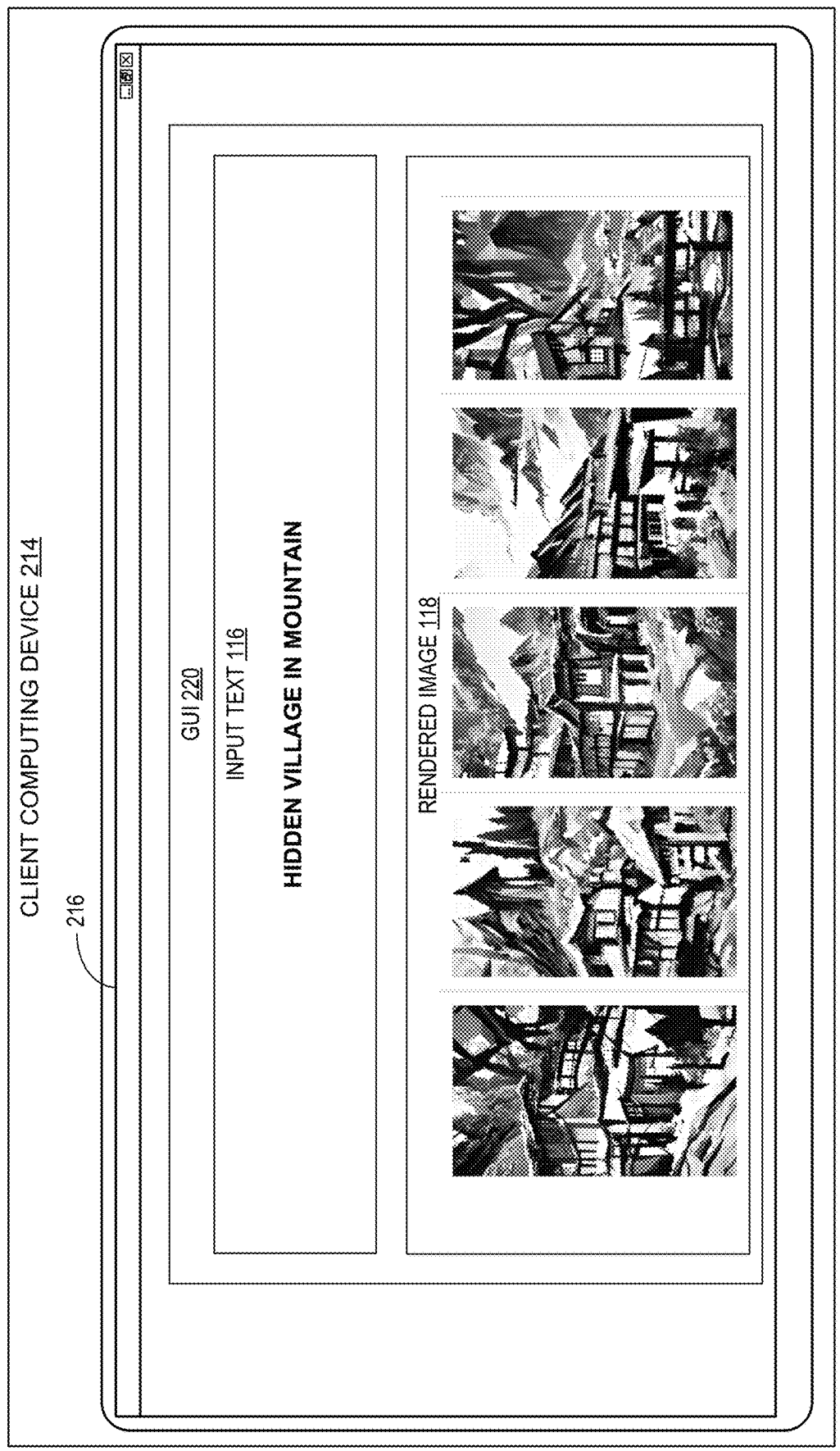
FIG. 7 is an example illustration of an application client showing input text and a rendered image corresponding to the input text, rendered by the inference computing system of FIG. 1.

Referring to FIG. 7, a schematic view is shown of an application client 216 for an image rendering program, which can be implemented on a client computing device 214 such as the one shown in FIG. 2. The application client 216 receives input containing an input text 116 through a graphical user interface 220. In response, the application client 216 generates and outputs a rendered image 118 corresponding to the input text 116 on the graphical user interface 220. In this example, the input text 116 is 'hidden village in mountain', and the rendered images 118 corresponds to the description of the input text 116.

Figure 8B:
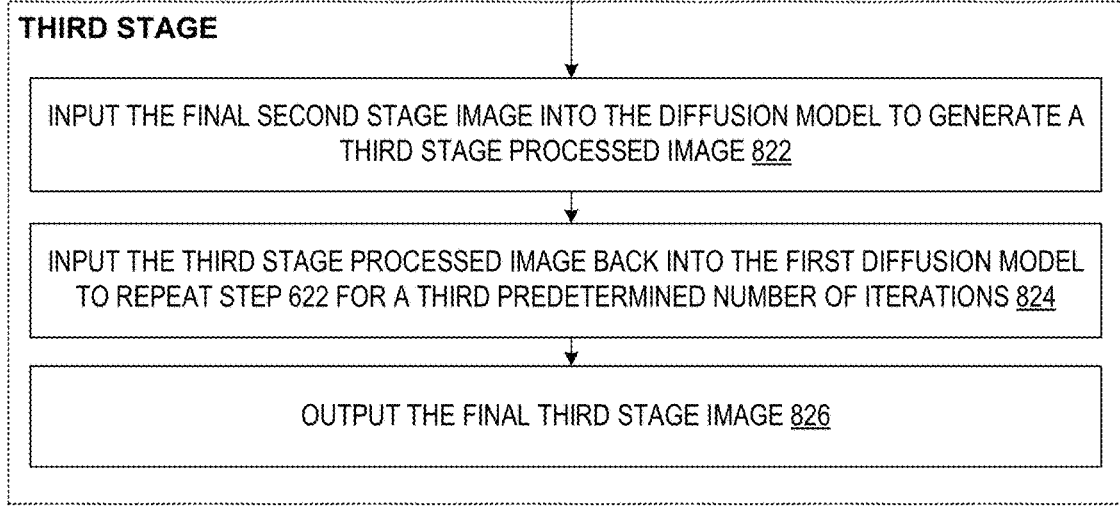

FIGS. 8A and 8B illustrate a flowchart of a computerized method 800 for generating and outputting a rendered image corresponding to an input text using a multi-algorithm diffusion sampling process. The following description of computerized method 800 is provided with reference to the software and hardware components described above and shown in FIGS. 1 to 7. It will be appreciated that computerized method 800 also may be performed in other contexts using other suitable hardware and software components.

At step 802, an input text is received from a user. The input text can include phrases that describe objects, scenes, and/or scenarios. The phrases can further include an artistic phrase describing an artistic style in which to render the image. At step 804, an initial image is inputted into a diffusion model to generate a first stage processed image. Various types of diffusion models can be implemented including the diffusion models described above, such as a diffusion model 424 trained using a data distillation and model distillation module 102. At step 806, the first stage processed image is inputted into a gradient estimator model to generate a first stage further-processed image. The gradient estimator model can be of a smaller size than the diffusion model used to generate the first stage processed image. For example, in some implementations, the gradient estimator model is at least 10 times smaller than the diffusion model used to generate the first stage processed image. At step 808, the first stage further-processed image is back-propagated through a text-image match gradient calculator to calculate a first stage gradient against the input text. Step 808 may include a step 808a of generating an image embedding based on the first stage further-processed image generated by the gradient estimator model, a step 808b of generating a text embedding based on the input text, and a step 808c of calculating a differential between the image embedding and the text embedding.

At step 810, the calculated first stage gradient is applied to the first stage processed image to generate an updated image. At step 812, the updated image is inputted back into the diffusion model to repeat steps 804 to 810 for a first predetermined number of iterations to generate a final first stage image.

Then at step 814, the final first stage image generated after repeating steps 804 to 810 of the first stage for the first predetermined number of iterations is used as a second stage image and inputted into the diffusion model to generate a second stage processed image. At step 816, the second stage processed image is back-propagated through the text-image match gradient calculator to calculate a second stage gradient against the input text. At step 818, the calculated second stage gradient is applied to the second stage processed image to generate an updated second stage image. At step 820, the updated second stage image applied with the calculated gradient is inputted back into the diffusion model to repeat steps 814 to 818 for a second predetermined number of iterations to generate a final second stage image.

Then at step 822, the final second stage image generated after repeating steps 814 to 818 at the second stage for the second predetermined number of iterations is inputted into the diffusion model to generate a third stage processed image. At step 824, the third stage processed image is inputted back into the diffusion model to repeat step 822 for a third predetermined number of iterations to generate a final third stage image. At step 826, the final third stage image generated after performing the third predetermined number of iterations is outputted as the output image. In some implementations, the third stage is not performed and the final second stage image is outputted as the output image.

Figure 9:
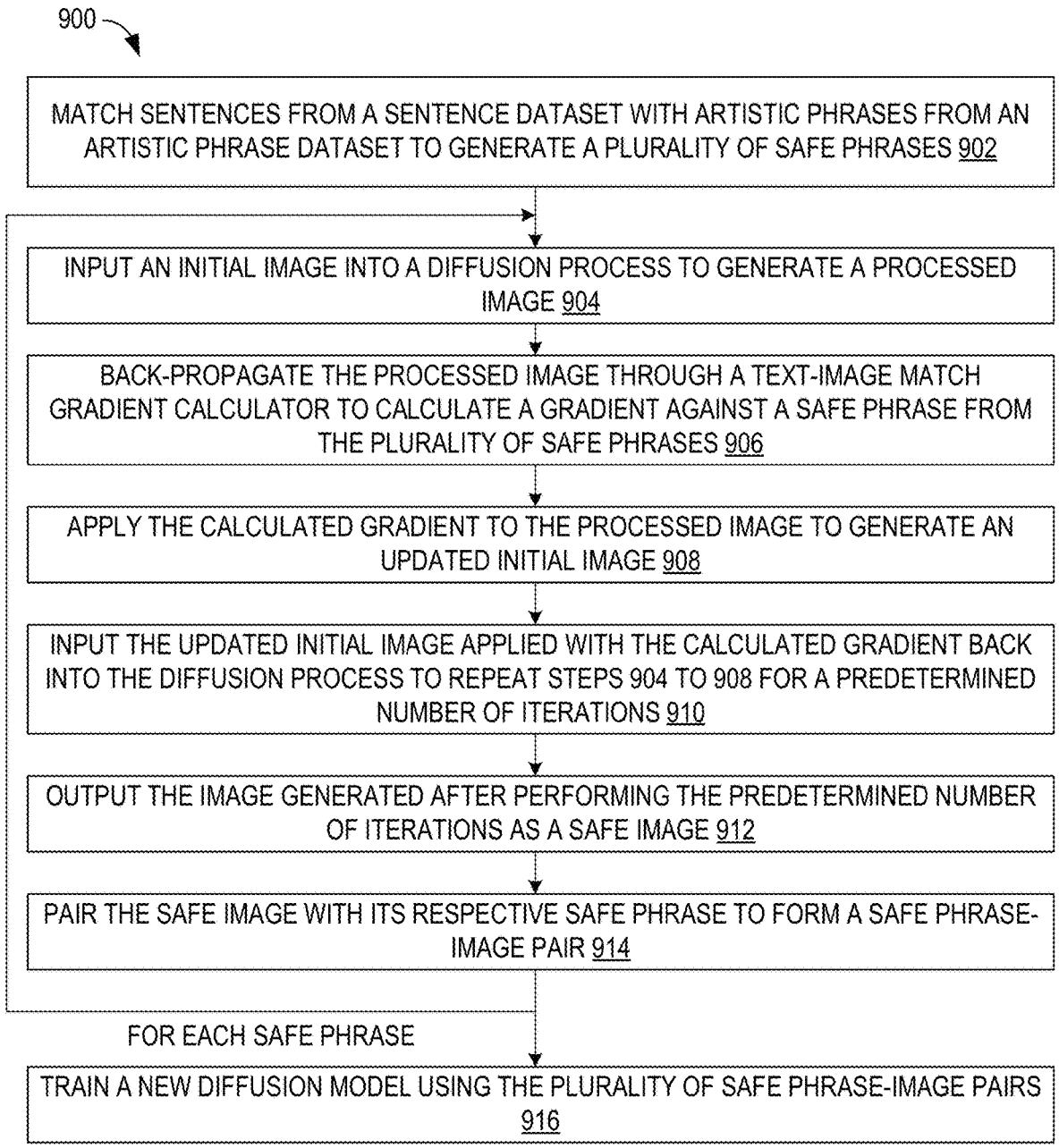
FIG. 9 is a flowchart of a method for training a diffusion model using data and model distillation according to an example embodiment of the present disclosure.

FIG. 9 illustrates a flowchart of a computerized method 900 for training a diffusion model using data and model distillation. The following description of computerized method 900 is provided with reference to the software and hardware components described above and shown in FIGS. 1 to 7. It will be appreciated that computerized method 900 also may be performed in other contexts using other suitable hardware and software components.

At step 902, sentences from a sentence dataset are matched with artistic phrases from an artistic phrase dataset to generate a plurality of safe phrases. The sentence and artistic phrase datasets may be manually or automatically curated to exclude any undesired or inappropriate content, such as personal names, names of groups of individuals, violent objects and scenes, biased terms, and/or other unsafe content. In some implementations, the datasets are curated to exclude undesired content according to a predetermined set of guidelines.

At step 904, an initial image is inputted into a diffusion process to generate a processed image. The diffusion process can include any of the processes described in the present disclosure. For example, the diffusion process can include the use of a diffusion model and a gradient estimator model. At step 906, the processed image is back-propagated through a text-image match gradient calculator to calculate a gradient against a safe phrase from the plurality of safe phrases. Step 906 may include generating an image embedding based on the processed image, generating a text embedding based on the input text, and calculating a differential between the image embedding and the text embedding. At step 908, the calculated gradient is applied to the processed image to generate an updated initial image. At step 910, the updated initial image applied with the calculated gradient is inputted back into the large diffusion model to repeat steps 904 to 908 for a predetermined number of iterations. At step 912, the image generated after performing the predetermined number of iterations is outputted as a safe image. At step 914, the safe image is paired with its respective safe phrase to form a safe phrase-image pair. A safe image can be generated for each safe phrase to form a plurality of safe phrase-image pairs. For example, steps 904 to 914 can be performed for each safe phrase in the plurality of safe phrases.

At step 916, the safe phrase-image pairs are used to train a new diffusion model. In many implementations, the new diffusion model is smaller than the first diffusion model. In further implementations, the new diffusion model is at least 5 times smaller than the first diffusion model. Training the new diffusion model can include generating a loss value. The loss value can include at least an identity loss and/or a directional loss. As the new diffusion model is trained using the safe image-phrase pairs generated from curated safe phrases, the model will be much less likely to output images with undesired content, such as unsafe content and/or undesired artistic styles.

Figure 10:
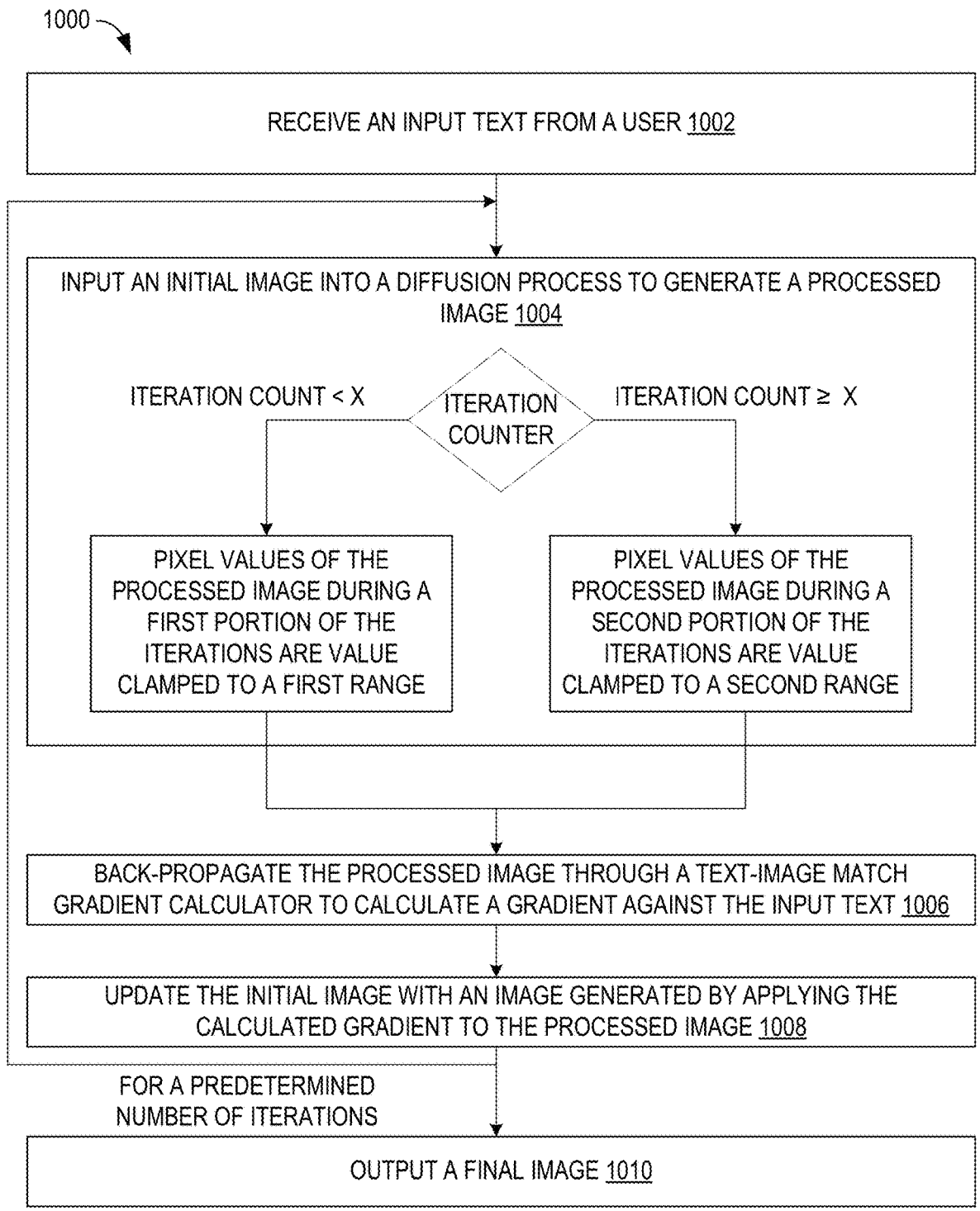
FIG. 10 is a flowchart of a method for generating an output image corresponding to an input text using a dynamic value clipping process according to an example embodiment of the present disclosure.

FIG. 10 illustrate a flowchart of a computerized method 1000 for generating and outputting a rendered image corresponding to an input text using a dynamic value clipping process. The following description of computerized method 1000 is provided with reference to the software and hardware components described above and shown in FIGS. 1 to 7. It will be appreciated that computerized method 1000 also may be performed in other contexts using other suitable hardware and software components.

At step 1002, an input text is received from a user. The input text can include phrases that describe objects, scenes, and/or scenarios. The phrases can further include an artistic phrase describing an artistic style in which to render the image. At step 1004, an initial image, which may include an image of random noise, is inputted into a diffusion process to generate a processed image. Different types of diffusion processes can be implemented, including those described in the sections above. For example, the diffusion process can include a multi-algorithm diffusion sampling module implemented with a diffusion model and a gradient estimator model. At step 1006, the processed image is back-propagated through a text-image match gradient calculator to calculate a gradient against the input text. Step 1006 may include generating an image embedding based on the processed image, generating a text embedding based on the input text, and calculating a differential between the image embedding and the text embedding. At step 1008, the initial image is updated with an image generated by applying the gradient to the processed image. Steps 1004 through steps 1008 are performed for a predetermined number of iterations. The predetermined number of iterations can vary. In some implementations, the predetermined number of iterations is between 70 to 100 iterations. At step 1010, a final image is outputted. The final image is the current updated initial image after the predetermined number of iterations has been performed.

The diffusion process in step 1004 can generate the processed image by applying a denoising process to the initial image. During a first portion of the predetermined number of iterations, pixel values of the processed image can be value clamped to a first range. For example, pixel values of the processed image that are higher than the maximum value of the first range are reduced to the maximum value of the first range, and pixel values of the processed image that are lower than the minimum value of the first range are increased to the minimum value of the first range. During a second portion of the predetermined number of iterations, pixel values of the processed image can be value clamped to a second range that is a subset of the first range. For example, the second range can be narrower than the first range. In some implementations, during a third portion of the predetermined number of iterations, pixel values of the processed image can be value clamped to a third range that is a subset of the second range.

Different value ranges and portion ratios of iterations can be implemented for the different clamping steps. In some implementations, the first portion is at least the first half of the predetermined number of iterations. In further implementations, the first portion is at least the first 70% of the predetermined number of iterations. The second portion can also vary. For example, the second portion can be approximately twenty percent of the predetermined number of iterations and is consecutive to the first portion. In some implementations, the second portion is the remaining number of iterations after the first portion. The value ranges become narrower for successive clamping steps. For example, the second value range is a subset of the first value range, and the third value range, if applicable, is a subset of the second value range. In some implementations, the first value range is approximately [−3,3]. In further implementations, the second value range is approximately [−1.4,1.4]. The values are normalized to the maximum value for a given pixel of the final output image. As such, the last clamping step can be limited to a value range of [−1.1].

Figure 11:
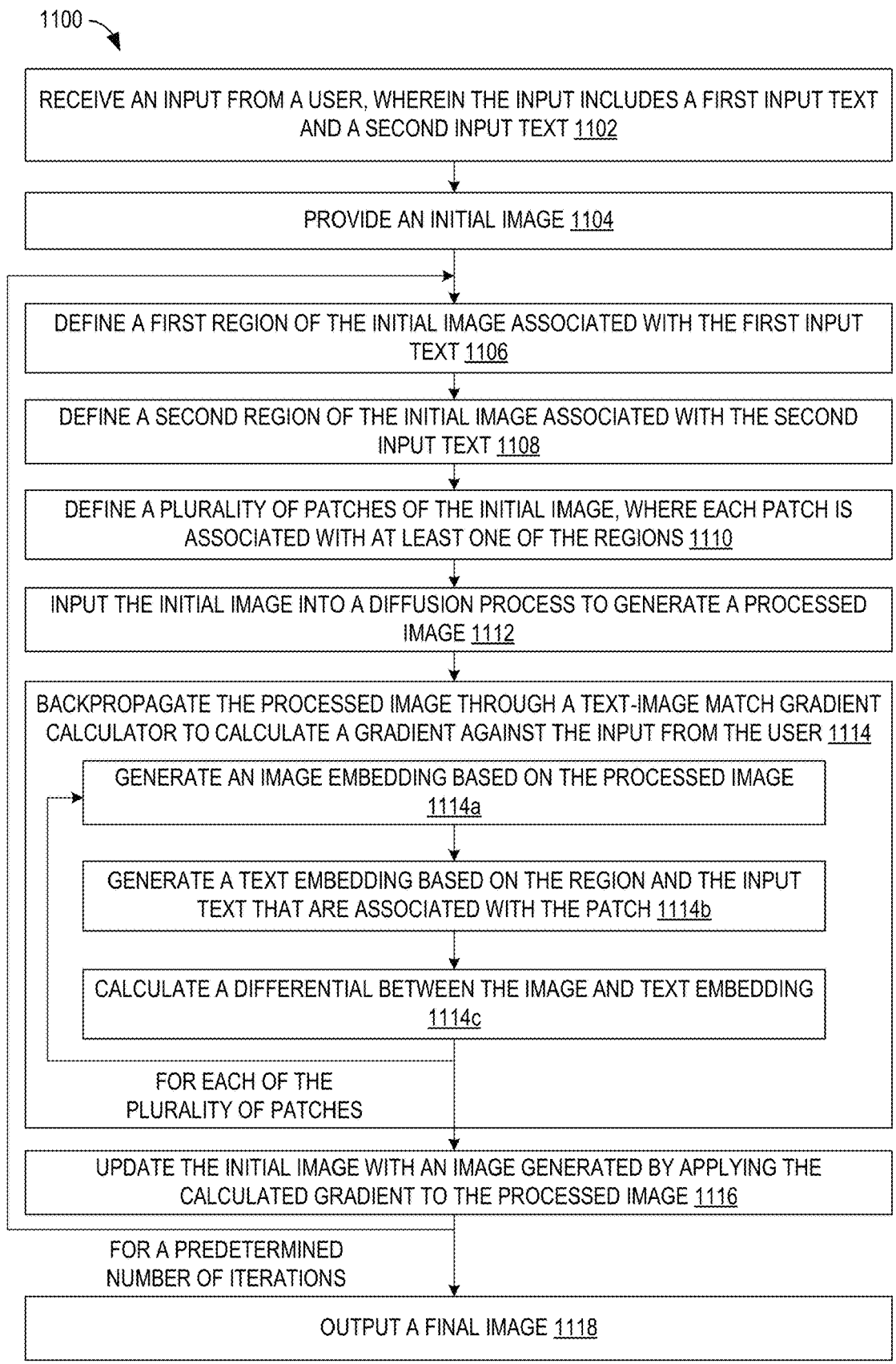
FIG. 11 is a flowchart of a method for generating an output image corresponding to an input text using a multi-text guided image cropping process according to an example embodiment of the present disclosure.

FIG. 11 illustrate a flowchart of a computerized method 1100 for generating and outputting a rendered image using a multi-text guided image cropping process. The following description of computerized method 1100 is provided with reference to the software and hardware components described above and shown in FIGS. 1 to 7. It will be appreciated that computerized method 1100 also may be performed in other contexts using other suitable hardware and software components.

At step 1102, an input is received from a user. The input can include a first input text and a second input text. In some implementations, the input includes at least a third input text. The input texts can include phrases that describe objects, scenes, and/or scenarios. The phrases can further include an artistic phrase describing an artistic style in which to render the image. The input can also include information specifying regions. At step 1104, an initial image, which may include an image of random noise is provided. At step 1106, a first region of the initial image is defined. The first region is associated with the first input text. At step 1108, a second region of the initial image is defined. The second region is associated with the second input text. The regions can be defined and determined in many different ways. In some implementations, the regions are determined based on information in the input received from the user. For example, the input could specify a region of the image where the content of the input text is to be generated. In some implementations, the regions are determined by applying natural language processing techniques on the input text.

At step 1110, a plurality of patches is defined for the initial image. Each patch is associated with at least one of the regions. Different association methods can be implemented. One method for dealing with such cases includes the use of a weighted average method. The text embedding for a given patch is the weighted average of the text embeddings from the intersected regions, where the weights are proportional to the intersected area. Another method includes the maximum intersection region dominating method where the text embedding for a given patch is the text embedding from the region with the largest area intersecting the given patch.

At step 1112, the initial image is inputted into a diffusion process to generate a processed image. Different types of diffusion processes can be implemented, including those described in the sections above. For example, the diffusion process can include a multi-algorithm diffusion sampling module implemented with a diffusion model and a gradient estimator model.

At step 1114, the processed image is back-propagated through a text-image match gradient calculator to calculate a gradient against the input text. Step 1114 may include an iteration of a series of steps for each patch in the plurality of patches. The series of steps includes a step 1114*a* of generating an image embedding based on the processed image, a step 1114*b* of generating a text embedding based the region and the input text associated with a given patch, and a step 1114*c* of calculating a differential between the image embedding and the text embedding.

At step 1116, the initial image is updated with an image generated by applying the gradient to the processed image. Steps 1106 through steps 1116 are performed for a predetermined number of iterations. The predetermined number of iterations can vary. In some implementations, the predetermined number of iterations is between 70 to 100 iterations. At step 1118, a final image is outputted. The final image is the current updated initial image after the predetermined number of iterations has been performed.

In some embodiments, the methods and processes described herein may be tied to a computing system of one or more computing devices. In particular, such methods and processes may be implemented as a computer-application program or service, an application-programming interface (API), a library, and/or other computer-program product.

Figure 12:
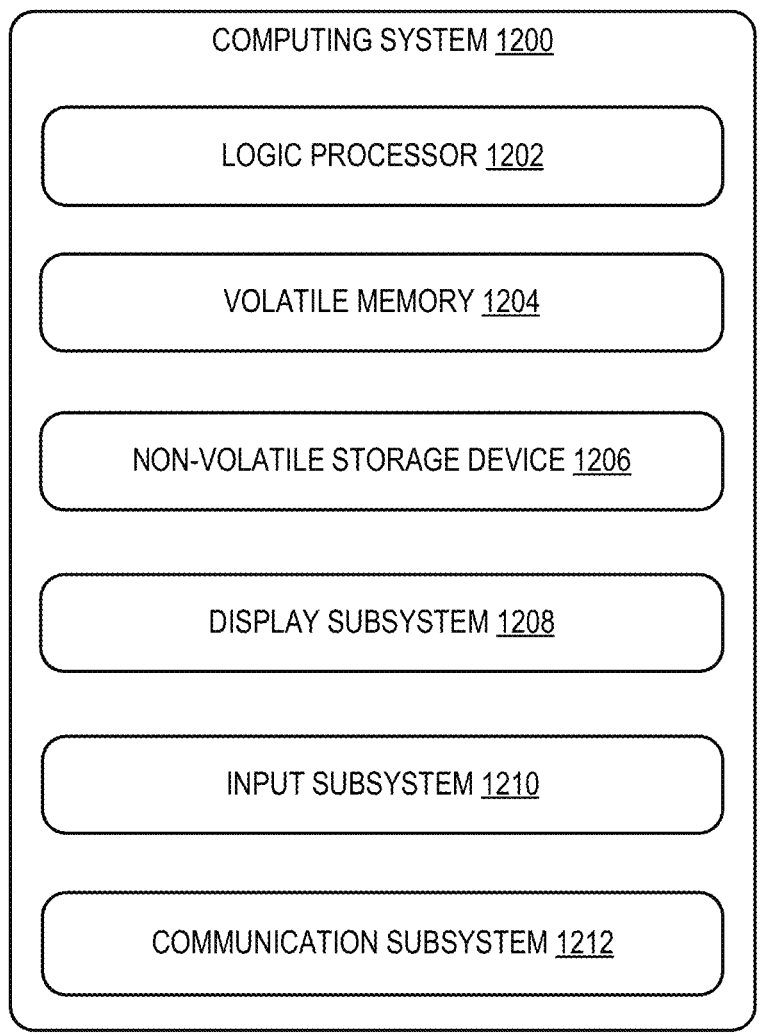
FIG. 12 shows an example computing environment of the present disclosure.

FIG. 12 schematically shows a non-limiting embodiment of a computing system 1200 that can enact one or more of the methods and processes described above. Computing system 1200 is shown in simplified form. Computing system 1200 may embody the training computing system 100, computing device 200, and the client computing device 214 described above and illustrated in FIGS. 1-3, respectively. Computing system 1200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 1200 includes a logic processor 1202, volatile memory 1204, and a non-volatile storage device 1206. Computing system 1200 may optionally include a display subsystem 1208, input subsystem 1210, communication subsystem 1212, and/or other components not shown in FIG. 12.

Logic processor 1202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 1202 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1206 includes one or more physical devices configured to hold instructions executable by the logic processors to implement the methods and processes described herein. When such methods and processes are implemented, the state of non-volatile storage device 1206 may be transformed—e.g., to hold different data.

Non-volatile storage device 1206 may include physical devices that are removable and/or built in. Non-volatile storage device 1206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1206 may include nonvolatile, dynamic, static, read/write, read-only, sequential-access, location-addressable, file-addressable, and/or content-addressable devices. It will be appreciated that non-volatile storage device 1206 is configured to hold instructions even when power is cut to the non-volatile storage device 1206.

Volatile memory 1204 may include physical devices that include random access memory. Volatile memory 1204 is typically utilized by logic processor 1002 to temporarily store information during processing of software instructions. It will be appreciated that volatile memory 1204 typically does not continue to store instructions when power is cut to the volatile memory 1204.

Aspects of logic processor 1202, volatile memory 1204, and non-volatile storage device 1206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1200 typically implemented in software by a processor to perform a particular function using portions of volatile memory, which function involves transformative processing that specially configures the processor to perform the function. Thus, a module, program, or engine may be instantiated via logic processor 1202 executing instructions held by non-volatile storage device 1206, using portions of volatile memory 1204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1208 may be used to present a visual representation of data held by non-volatile storage device 1206. The visual representation may take the form of a graphical user interface (GUI). As the herein described methods and processes change the data held by the non-volatile storage device, and thus transform the state of the non-volatile storage device, the state of display subsystem 1208 may likewise be transformed to visually represent changes in the underlying data. Display subsystem 1208 may include one or more display devices utilizing virtually any type of technology. Such display devices may be combined with logic processor 1202, volatile memory 1204, and/or non-volatile storage device 1206 in a shared enclosure, or such display devices may be peripheral display devices.

When included, input subsystem 1210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1212 may be configured to communicatively couple various computing devices described herein with each other, and with other devices. Communication subsystem 1212 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1200 to send and/or receive messages to and/or from other devices via a network such as the Internet.

The following paragraphs provide additional support for the claims of the subject application. One aspect provides a computer system for generating an output image corresponding to an input text, the computing system including a processor and memory of a computing device. The processor is configured to execute a program using portions of the memory to receive the input text from a user and, for a predetermined number of iterations, input an initial image into a diffusion process to generate a processed image, back-propagate the processed image through a text-image match gradient calculator to calculate a gradient against the input text, and update the initial image with an image generated by applying the calculated gradient to the processed image. The pixel values of the processed image during a first portion of the predetermined number of iterations are value clamped to a first range. The pixel values of the processed image during a second portion of the predetermined number of iterations are value clamped to a second range that is a subset of the first range. In this aspect, additionally or alternatively, the first portion of the predetermined number of iterations is at least seventy percent of the predetermined number of iterations. In this aspect, additionally or alternatively, the second portion of the predetermined number of iterations is at least twenty percent of the predetermined number of iterations. In this aspect, additionally or alternatively, the first range is approximately [−3,3] unit Gaussian normalized to a maximum value of a pixel. In this aspect, additionally or alternatively, the second range is approximately [−1.4,1.4] unit Gaussian. In this aspect, additionally or alternatively, pixel values of the processed image during a third portion of the predetermined number of iterations are value clamped to a third range that is a subset of the second range. In this aspect, additionally or alternatively, the third range is approximately [−1,1] unit Gaussian normalized to a maximum value of a pixel. In this aspect, additionally or alternatively, the diffusion process is a denoising diffusion implicit model. In this aspect, additionally or alternatively, the diffusion process includes a gradient estimator model. In this aspect, additionally or alternatively, the predetermined number of iterations is between 70 and 100 iterations.

Another aspect provides a method for generating an output image corresponding to an input text, the method including steps to receive the input text from a user and, for a predetermined number of iterations, input an initial image into a diffusion process to generate a processed image, back-propagate the processed image through a text-image match gradient calculator to calculate a gradient against the input text, and update the initial image with an image generated by applying the calculated gradient to the processed image. The pixel values of the processed image during a first portion of the predetermined number of iterations are value clamped to a first range. The pixel values of the processed image during a second portion of the predetermined number of iterations are value clamped to a second range that is a subset of the first range. In this aspect, additionally or alternatively, the first portion of the predetermined number of iterations is at least seventy percent of the predetermined number of iterations. In this aspect, additionally or alternatively, the second portion of the predetermined number of iterations is at least twenty percent of the predetermined number of iterations. In this aspect, additionally or alternatively, the first range is approximately [−3,3] unit Gaussian normalized to a maximum value of a pixel. In this aspect, additionally or alternatively, the second range is approximately [−1.4,1.4] unit Gaussian. In this aspect, additionally or alternatively, pixel values of the processed image during a third portion of the predetermined number of iterations are value clamped to a third range that is a subset of the second range. In this aspect, additionally or alternatively, the third range is approximately [−1,1] unit Gaussian normalized to a maximum value of a pixel. In this aspect, additionally or alternatively, the diffusion process is a denoising diffusion implicit model. In this aspect, additionally or alternatively, the diffusion process includes a gradient estimator model.

Another aspect provides a computer system for generating an output image corresponding to an input text, the computing system including a processor and memory of a computing device. The processor is configured to execute a program using portions of the memory to receive the input text from a user, process an initial image through a first diffusion stage to generate a final first stage image, wherein the first diffusion stage includes processing the initial image, for a first predetermined number of iterations, using a diffusion model, a gradient estimator model smaller than the diffusion model, and a text-image match gradient calculator, and process the final first stage image through a second diffusion stage to generate a final second stage image. The second diffusion stage includes using the final first stage image as a second stage image to, for a second predetermined number of iterations, perform steps to input the second stage image through the diffusion model to generate a second stage processed image, back-propagate the second stage processed image through the text-image match gradient calculator to calculate a second stage gradient against the input text, and update the second stage image by applying the second stage gradient to the second stage processed image. The pixel values of the processed initial image during a first portion of the first predetermined number of iterations are value clamped to a first range. The pixel values of the processed initial image during a second portion of the first predetermined number of iterations are value clamped to a second range that is a subset of the first range.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

It will be appreciated that "and/or" as used herein refers to the logical disjunction operation, and thus A and/or B has the following truth table.

| A | B | A and/or B |
|---|---|------------|
| T | T | T |
| T | F | T |
| F | T | T |
| F | F | F |

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system for generating an output image corresponding to an input text, the computing system comprising:
a processor and memory of a computing device, the processor being configured to execute a program using portions of the memory to:
receive the input text from a user; and
for a predetermined number of iterations:
input an initial image into a diffusion process to generate a processed image;
back-propagate the processed image through a text-image match gradient calculator to calculate a gradient against the input text; and
update the initial image with an image generated by applying the calculated gradient to the processed image;
wherein:
pixel values of the processed image during a first portion of the predetermined number of iterations are value clamped to a first range; and
pixel values of the processed image during a second portion of the predetermined number of iterations are value clamped to a second range that is a subset of the first range.

2. The computer system of claim 1, wherein the first portion of the predetermined number of iterations is at least seventy percent of the predetermined number of iterations.

3. The computer system of claim 2, wherein the second portion of the predetermined number of iterations is at least twenty percent of the predetermined number of iterations.

4. The computer system of claim 1, wherein the first range is approximately [−3,3] unit Gaussian normalized to a maximum value of a pixel.

5. The computer system of claim 4, wherein the second range is approximately [−1.4,1.4] unit Gaussian.

6. The computer system of claim 1, wherein pixel values of the processed image during a third portion of the predetermined number of iterations are value clamped to a third range that is a subset of the second range.

7. The computer system of claim 6, wherein the third range is approximately [−1,1] unit Gaussian normalized to a maximum value of a pixel.

8. The computer system of claim 1, wherein the diffusion process is a denoising diffusion implicit model.

9. The computer system of claim 1, wherein the diffusion process includes a gradient estimator model.

10. The computer system of claim 1, wherein the predetermined number of iterations is between 70 and 100 iterations.

11. A method for generating an output image corresponding to an input text, the method comprising steps to:
receive the input text from a user; and
for a predetermined number of iterations:
input an initial image into a diffusion process to generate a processed image;
back-propagate the processed image through a text-image match gradient calculator to calculate a gradient against the input text; and
update the initial image with an image generated by applying the calculated gradient to the processed image;
wherein:
pixel values of the processed image during a first portion of the predetermined number of iterations are value clamped to a first range; and
pixel values of the processed image during a second portion of the predetermined number of iterations are value clamped to a second range that is a subset of the first range.

12. The method of claim 11, wherein the first portion of the predetermined number of iterations is at least seventy percent of the predetermined number of iterations.

13. The method of claim 12, wherein the second portion of the predetermined number of iterations is at least twenty percent of the predetermined number of iterations.

14. The method of claim 11, wherein the first range is approximately [−3,3] unit Gaussian normalized to a maximum value of a pixel.

15. The method of claim 14, wherein the second range is approximately [−1.4,1.4] unit Gaussian.

16. The method of claim 11, wherein pixel values of the processed image during a third portion of the predetermined number of iterations are value clamped to a third range that is a subset of the second range.

17. The method of claim 16, wherein the third range is approximately [−1,1] unit Gaussian normalized to a maximum value of a pixel.

18. The method of claim 11, wherein the diffusion process is a denoising diffusion implicit model.

19. The method of claim 11, wherein the diffusion process includes a gradient estimator model.

20. A computer system for generating an output image corresponding to an input text, the computing system comprising:
a processor and memory of a computing device, the processor being configured to execute a program using portions of the memory to:
receive the input text from a user;
process an initial image through a first diffusion stage to generate a final first stage image, wherein the first diffusion stage includes processing the initial image, for a first predetermined number of iterations, using a diffusion model, a gradient estimator model smaller than the diffusion model, and a text-image match gradient calculator; and
process the final first stage image through a second diffusion stage to generate a final second stage image, wherein the second diffusion stage includes using the final first stage image as a second stage image to, for a second predetermined number of iterations, perform steps to:
input the second stage image through the diffusion model to generate a second stage processed image;
back-propagate the second stage processed image through the text-image match gradient calculator to calculate a second stage gradient against the input text; and
update the second stage image by applying the second stage gradient to the second stage processed image;

wherein:
pixel values of the processed initial image during a first portion of the first predetermined number of iterations are value clamped to a first range; and
pixel values of the processed initial image during a second portion of the first predetermined number of iterations are value clamped to a second range that is a subset of the first range.

* * * * *